United States Patent [19]

Valdiserri et al.

[11] 4,206,111
[45] Jun. 3, 1980

[54] STABILIZED POLYOLEFINS

[75] Inventors: Leo L. Valdiserri, Belpre, Ohio; Elyse M. Bullock, Parkersburg, W. Va.

[73] Assignee: Borg-Warner Corporation, Chicago, Ill.

[21] Appl. No.: 932,885

[22] Filed: Aug. 10, 1978

Related U.S. Application Data

[63] Continuation of Ser. No. 794,444, May 6, 1977, abandoned.

[51] Int. Cl.² .................... C08K 5/13; C08K 5/34; C08K 5/52
[52] U.S. Cl. .................... 260/45.8 NT; 252/400 A; 260/45.7 PH; 260/45.8 R; 260/45.85 B
[58] Field of Search ............ 260/45.85 B, 45.8 R, 260/45.8 NT (U.S. only)

[56] References Cited

U.S. PATENT DOCUMENTS

| | | | |
|---|---|---|---|
| 3,039,993 | 6/1962 | Friedman | 260/45.7 PH |
| 3,322,718 | 5/1967 | Jacob | 260/45.7 PH |
| 3,409,587 | 11/1968 | Mills | 260/45.7 PH |
| 3,502,613 | 3/1970 | Berger | 260/45.85 B |
| 3,641,213 | 2/1972 | Rodgers | 260/45.95 F |
| 3,781,242 | 12/1973 | Mathis et al. | 260/45.85 B |
| 3,878,266 | 4/1975 | McInerney | 260/45.85 B |
| 3,988,293 | 10/1976 | Mills | 260/45.8 R |
| 4,025,486 | 5/1977 | Gilles | 260/45.8 NT |
| 4,066,608 | 1/1978 | Van Brederode | 260/45.8 NT |
| 4,094,855 | 6/1978 | Spivack | 260/45.85 B |

*Primary Examiner*—Howard E. Schain
*Assistant Examiner*—R. A. White
*Attorney, Agent, or Firm*—Joseph Shekleton

[57] ABSTRACT

An ultraviolet stabilizer for olefin polymers. It is a combination of a 2-hydroxyphenylbenzotriazole, a dialkyl pentaerythritol diphosphite and a phenolic ester oxidation inhibitor.

6 Claims, No Drawings

STABILIZED POLYOLEFINS

This is a continuation of application Ser. No. 794,444 filed May 6, 1977, now abandoned.

This invention relates as indicated to stabilized polyolefins. More particularly it relates to such polyolefins as are stabilized against deterioration which ordinarily results from prolonged exposure to ultraviolet light. Still more particularly, it relates to the stabilization of polyolefins as above by means of small proportions of certain additives.

BACKGROUND OF THE INVENTION

Ultraviolet light has a degradative effect on olefin polymers, the severity of which is dependent on the particular polymer and the geographical location of exposure. The degradation may take the form of discoloration, loss of tensile and impact strength, distortion of initial flexibility, dimensional change, surface craze, cracking, powdering or increased electrical conductivity. All of these effects may result from the breaking of carbon-to-carbon bonds in the polymer chain followed by immediate oxidation of the chain fragments.

It is well known that the addition of certain materials to an olefin polymer will impart a degree of stabilization to that polymer with respect to its resistance to the destructive forces of ultraviolet radiation. These materials, in one instance, function as preferential acceptors of incident ultraviolet radiation because they have a much higher affinity for such radiation than does the olefin polymer. It appears that they absorb harmful radiation and dissipate it as harmless energy. They thus form a protective shield for the polymer in which they are present.

Although there are many types of ultraviolet stabilizers, an important class includes the 2-hydroxyphenylbenzotriazoles. They offer strong intensity and broad ultraviolet stabilization with a fairly sharp wavelength limit close to the visible region. They absorb light at 280–390 mm.

Olefin polymers which are stabilized by an ultraviolet stabilizer frequently contain also an oxidation inhibitor. This is especially so where it is important to achieve light stable polymer compositions. A wide variety of antioxidants are available.

McNally, U.S. Pat. No. 4,000,101, teaches the combined use of certain phenolic antioxidants, pentaerythritol diphosphites and ultraviolet stabilizers, in olefin polymers. The compositions there disclosed, however, contain a rather complex polythiopolyphoshite as the principal polymer additive.

Mills, U.S. Pat. No. 3,988,293, shows the particular combination of 2-hydroxy-4-n-octoxybenzophenone and distearyl pentaerythritol diphosphite as a stabilizer for olefin polymers.

The specification of pending U.S. application Ser. No. 697,637, filed June 18, 1976, teaches the combination of distearyl pentaerythritol diphosphite with a wide variety of other polymer additives including 2,(2'-hydroxy-5'-methyl phenol)benzotriazoles.

Dexter et al., U.S. Pat. No. 3,285,855 and U.S. Pat. No. 3,644,482, show (4-hydroxy-5-alkylphenyl)alkanoic acid esters of monohydric and polyhydric alcohols and refer to their combined use with "synergizing stabilizers (UV absorbers, phosphites, dialkyl thiodipropionates, and the like." Gilles, U.S. Pat. No. 3,531,483 contains a similar statement, applicable to the hydroxyphenylalkeneyl isocyanurates.

SUMMARY OF THE INVENTION

It has been found that the effectiveness of certain 2-hydroxyphenylbenzotriazoles as ultraviolet stabilizers in olefin polymers is unexpectedly enhanced by the presence of small proportions of a dialkyl pentaerythritol diphosphite and certain phenolic ester oxidation inhibitors. The combination of these three additives is effective to extend the useful life of polypropylene, for example, by many hours.

DESCRIPTION OF THE PREFERRED EMBODIMENTS

The 2-hydroxyphenylbenzotriazoles contemplated herein are those which conform to the structural formula

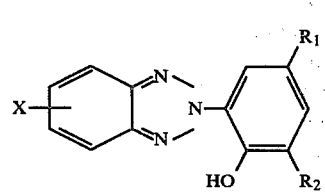

wherein $R_1$ is lower alkyl or halogen (preferably chlorine), $R_2$ is lower alkyl, halogen (preferably chlorine) or hydrogen, and X is chlorine or hydrogen.

Illustrative examples of such 2-hydroxyphenylbenzotriazoles include 2(2'-hydroxy-3',5'-ditertiarybutylphenyl)5-chlorobenzotriazole (Tinuvin 327), 2-(2'-hydroxy-3',5'-dimethylphenyl)benzotriazole, 2-(2'-hydroxy-5'-tertiarybutylphenyl)benzotriazole, 2-(2'-hydroxy-5'-amylphenyl)5-chlorobenzotriazole, 2-(2'-hydroxy-3'-tertiarybutyl-5'-methylphenyl)benzotriazole (Tinuvin 326), 2-(2'-hydroxy-5-methylphenyl)-benzotriazole (Tinuvin P), 2-(2'-hydroxy-3',5'-dimethylphenyl)5-chlorobenzotriazole, 2-(2'-hydroxy-3',5'-ditertiaryoctylphenyl)benzotriazole (Tinuvin 328), 2-(2'-hydroxy-3',5'-dichlorophenyl)benzotriazole, and 2-(2'-hydroxy-3'-methyl-5'-tertiaryoctylphenyl)benzotriazole. The term "lower alkyl" denotes an alkyl group having 1–10 carbon atoms.

Many of the benzotriazoles of this invention are available under the trademark designation Tinuvin 326, Tinuvin 327, Tinuvin 328, Tinuvin P, etc. (See above.) They may be prepared by coupling an aromatic diazo compound with an aromatic amine, followed by oxidation of the coupled intermediate. An illustrative preparation is as follows:

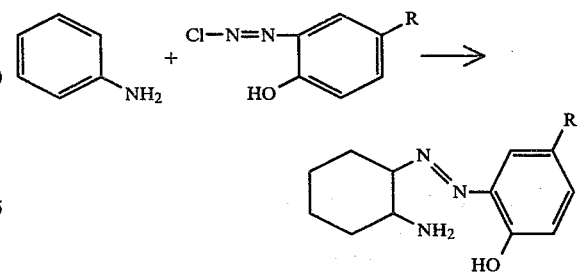

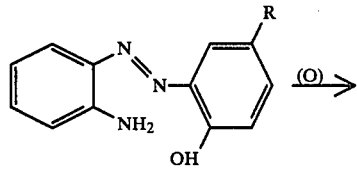

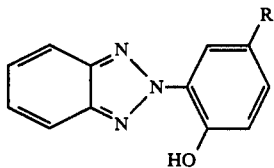

Other methods of preparation are set out in U.S. Pat. No. 3,004,896 (Heller et al.) and U.S. Pat. No. 3,189,615 (Heller et al.).

These benzotriazoles are used, for the purposes of this invention, in concentrations ranging from about 0.01 percent to about 5.0 percent. Best results are obtained at concentrations within the range of from about 0.1 percent to about 0.5 percent, based on the olefin polymer.

The dialkyl pentaerythritol diphosphite component of the combination of the invention may be either the spiro or the caged isomer, i.e.,

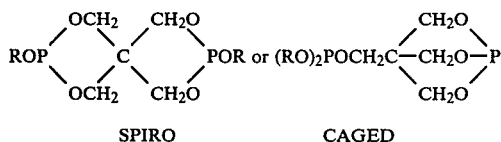

SPIRO          CAGED or it may be a mixture, in any proportion, of the two. R in the above equation is an alkyl group of 8–20 carbon atoms. Such a mixture results from the reaction of an alcohol, as the source of R, with diphenyl pentaerythritol diphosphite, which in turn may be prepared by the reaction of triphenyl phosphite with pentaerythritol. The alkyl group preferably is stearyl, i.e., $C_{18}H_{37}$; other illustrative alkyl radicals include decyl, dodecyl, tetradecyl, hexadecyl and eicosyl radicals.

A preferred form of such dialkyl pentaerythritol diphosphite is that in which the diphosphite is mixed with a small amount of the alcohol from which the diphosphite is prepared, e.g., stearyl alcohol. This is especially preferred where the alkyl groups are large, i.e., hexadecyl, stearyl, eicosyl, etc., and where it is desirable to insure the friable nature of the solid product. The presence of 5–10% of stearyl alcohol, for example, imparts to distearyl pentaerythritol diphosphite, a decidedly friable character. This is desirable because it permits the product to be handled more conveniently. The usual method of preparing such a product involves simply using an excess of the alcohol, e.g., stearyl alcohol, in the reaction with diphenyl pentaerythritol diphosphite.

The relative proportions of dialkyl pentaerythritol diphosphite used herein range from about 0.05 percent to about 1.0 percent, based on the olefin polymer.

The phenolic ester oxidation inhibitors contemplated herein are those embraced by the structural formula

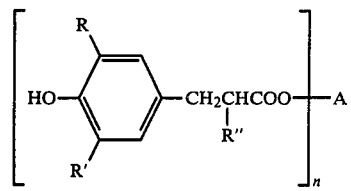

where R and R' are lower alkyl, i.e., alkyl of 1–10 carbon atoms, R" is lower alkyl or hydrogen, n is 1–4, and A is the residue of an alkanol or alkane polyol. Illustrative examples of A include

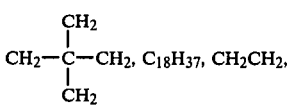

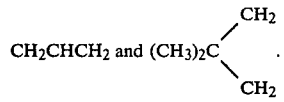

A contains 2–24 carbon atoms. Preferably, A is $C_{18}H_{37}$. The relative proportion of antioxidant used in the stabilized polyolefins of this invention range from about 0.01 percent to about 3.0 percent, based on the olefin polymer.

These stabilizing ingredients may be added to the olefin polymer in any conventional manner. They may, for example, be blended into the polymer as dry powders, or they may be dissolved in one or more solvents and sprayed onto finely divided polymer particles, or they may be blended as a melt in an extruder, or they may be mixed on a roll mill, or in a Banbury mixer.

Other additives can also be added to the olefin polymer including fillers, pigments, antistatic agents and the like. Metal stearates, for example, are commonly added as lubricants, or as neutralizers, or to impart a measure of heat stability to the polymer composition.

The olefin polymer compositions contemplated herein can be converted by extrusion, injection molding, blow molding and the like into a variety of molded objects, filaments, films, sheets, etc.

The efficacy of these polymer compositions is shown by data obtained from Weather-Ometer testing using a xenon arc as a source of ultraviolet radiation. The test samples are held by clamps and the atmosphere in the Weather-Ometer is maintained at a temperature of 110° F. For 20 minutes of each hour of the test period a thin spray of water is applied to the samples to simulate rainfall. Test samples are prepared by compression molding the indicated polymer compositions to form an 0.003-inch thick film.

The test samples are removed from the Weather-Ometer at periodic intervals, usually every 100 hours, and analyzed for carbonyl content by means of infrared curves. That is, the area under the peak at 5.8 microns is taken as a quantitative measure of the carbonyl content of the test sample. When the test sample is shown to have developed an increase of 0.1 percent in carbonyl content, it is regarded as having failed and the hours of exposure until such failure is a measure of the efficacy of the test sample as an ultraviolet stabilizer.

Each of the test samples, except for No. 1, contained 100 parts of polypropylene, 0.05 parts of calcium stearate and 0.1 part of octadecyl 3(4-hydroxy 3,5-ditertiarybutylphenyl)propionate. Sample No. 1 contained only 100 parts of polypropylene and 0.05 parts of calcium stearate. The test results are as follows:

| Test Sample | UV Stabilizer[a] | Phosphite[b] | Hours to Failure |
|---|---|---|---|
| 1[c] | — | — | 140 |
| 2 | — | — | 470 |
| 3 | 0.15 | — | 920 |
| 4 | 0.30 | — | 1150 |
| 5 | 0.15 | 0.15 | 1780 |

[a] 2(2′-hydroxy-3′,5′-ditertiarybutylphenyl)5-chlorobenzotriazole.
[b] distearyl pentaerythritol diphosphite.
[c] contains no antioxidant.

The olefin polymers which are benefitted by the above combination of stabilizing additives include homopolymers and copolymers of monoolefins; preferably those monoolefins having 1–4 carbon atoms. Illustrative examples include polyethylene (both low density and high density), polypropylene, polyisobutylene, and copolymers of ethylene, propylene and isobutylene. EPDM polymers are also contemplated.

We claim:

1. A polymer composition stabilized against deterioration in the presence of ultraviolet radiation comprising an olefin polymer and stabilizing amounts of (1) a 2-hydroxyphenylbenzotriazole having the structural formula

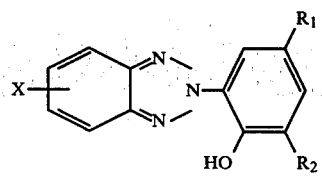

where $R_1$ is lower alkyl or halogen, $R_2$ is lower alkyl, halogen or hydrogen, and X is chlorine or hydrogen, (2) a dialkyl penetaerythritol diphosphite wherein the alkyl groups each contain 8–20 carbon atoms, and (3) a phenolic ester oxidation inhibitor having the structural formula

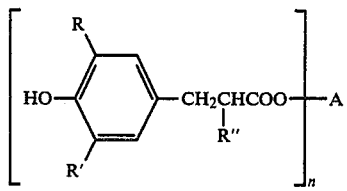

where R and R′ are lower alkyl, R″ is lower alkyl or hydrogen, n is 1–4, and A is the residue of an alkanol or alkane polyol.

2. The polymer composition of claim 1 wherein the olefin polymer is a polymer of propylene.

3. The polymer composition of claim 1 wherein the olefin polymer is polypropylene.

4. The polymer composition of claim 1 wherein component (1) is 2,(2′-hydroxy-3′,5′-ditertiarybutylphenyl)5-chlorobenzotriazole.

5. The polymer composition of claim 1 wherein component (2) is distearyl pentaerythritol diphosphite.

6. A method for stabilizing an olefin against deterioration in the presence of ultraviolet radiation comprising adding stabilizing amounts of (1) a 2-hydroxyphenylbenzotriazole having the structural formula

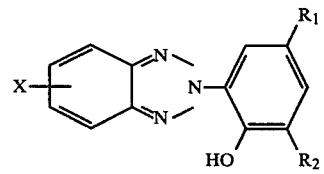

where $R_1$ is lower alkyl or halogen, $R_2$ is lower alkyl, halogen, or hydrogen, and X is chlorine or hydrogen, (2) a dialkyl pentaerythritol diphosphite wherein the alkyl groups each contain 8–20 carbon atoms, and (3) a phenolic ester oxidation inhibitor having the structural formula

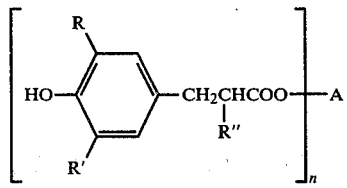

where R and R′ are lower alkyl, R″ is lower alkyl or hydrogen, n is 1–4, and A is the residue of an alkanol or alkane polyol.

* * * * *